UNITED STATES PATENT OFFICE.

HENRI LISSAGARAY AND HIPPOLYTE LEPLAY, OF PARIS, FRANCE.

PROCESS OF EXTRACTING AND MELTING TALLOW AT A LOW TEMPERATURE.

SPECIFICATION forming part of Letters Patent No. 295,184, dated March 18, 1884.

Application filed July 9, 1883. (No specimens.) Patented in France September 4, 1882, No. 150,936, and in England November 23, 1882, No. 5,575.

*To all whom it may concern:*

Be it known that we, HENRI LISSAGARAY and HIPPOLYTE LEPLAY, both citizens of the French Republic, and residents of Paris, France, have jointly invented an Improved Process and Apparatus for Extraction and Fusion of Tallow, of which the following is a specification.

This invention has for its object to effect the complete separation of the fatty matter from the nitrogenous portions of animal fat without the use of acids in the presence of pure water, or water containing a solution of chloride of sodium, the nitrogenous tissues being collected and utilized as food or for other purposes.

This process, which is specially applicable for the production of oleomargarine, enables the whole of the tallow to be extracted at a temperature below 130° Fahrenheit.

The process consists, mainly, in the complete destruction of the affinity existing between the nitrogenous matter and the tallow contained in animal fat, such destruction being effected by mechanical friction exercised on the nitrogenous matter, and which is termed a "pugging" process. For this purpose the fat is in the first instance chopped small, and the friction exercised by such chopping operation on the nitrogenous matter will facilitate the separation thereof by the subsequent pugging process. The chopping process should be effected at the lowest possible temperature, while the pugging process should be carried on at a temperature as near the melting-point of the fat as possible. Both operations may, however, be carried on in one and the same apparatus, provided the fat has been previously warmed, or is heated during the operation, the friction produced by the pugging action being transmitted to the nitrogenous matter, notwithstanding the resistance of the fatty body which surrounds it, which resistance decreases in the inverse ratio of the temperature. Any arrangement of apparatus may be employed which is capable of effecting a sufficient subdivision of the fat and of exercising the necessary friction on the nitrogenous matter, by preference, at a sufficiently-elevated temperature. The following arrangement is however, employed by preference: The fat, preferably warmed to a temperature of about 50° Fahrenheit, is finely chopped in a horizontal cylindrical chopping apparatus, such as is known as the "American chopping-machine." The agglomerated mass, which is expelled, under pressure, from the apparatus, is in addition separated by a shredding-machine, and the separated matter falls into an annular vat heated by a steam-jacket, and having heavy edge-runners revolving round a vertical axis. The fat is brought by revolving scrapers from the sides of the vat beneath the edge-runners again, and it is thus continuously subjected to the crushing and frictional action of these while heated to a temperature of about from 68° to 86° Fahrenheit. After being sufficiently subjected to this action, the mass is made to pass out through a side opening into a wooden case or drum, by preference of octagonal prismatic shape, similar to a butter-churn, and having fixed along one of its internal sides a scoop which stops short at a certain distance from each end. The pugged fat and water previously heated to a temperature of about 136° Fahrenheit being placed in this churn, the quantity being not more than one-half the capacity of the churn, and the proportion of water being two-thirds the weight of the fat. The drum is then rotated, the scoop being made at each revolution to take up a quantity of hot water, and to deliver it onto the fat during the next semi-revolution, and this operation being continued while the fat is being agitated by falling over from side to side during the rotation of the drum, an intimate mixture thereof with the water will be effected.

Steam is supplied through a pipe passing in through the hollow trunnion of the drum to make good the heat given off by the water to the fat, the pipe, which is held stationary, being bent downward and extending to within a short distance of the sides of the drum. A second pipe, passing through the other trunnion of the drum and bent upward therein, serves to allow of the escape of air from the drum, driven out by the steam-pressure. The drum has a hole in one of its sides closed water-tight by a cover, through which hole the drum is charged with fat from a hopper, and from which the fat, after being treated, is discharged into a second hopper below, which conducts it into a precipitating-vat.

The steam-pipe of the mixing-drum should be sufficiently large to allow of the rapid heating of its contents. The treatment should, however, not be less than five minutes in duration, so as to give sufficient time for effecting an intimate mixture. It has been found that the pugged fat, which will immediately clog an ordinary screen, will not do so to a smooth perforated plate if allowed to pass thereon at a sufficiently small angle, the greater part of the perforations being found to remain open, and the whole may be kept clear by the occasional application of a steam-jet to both sides of the plate. The fatty mass is therefore discharged from the mixing apparatus into a second polygonal drum, one of whose sides is formed of perforated sheet metal placed at an angle of about forty-five degrees to the base, the perforations being from 0.1 inch to 0.2 inch diameter. In this drum the mixture of tallow and water will pass through the perforations, while the greater portion of the nitrogenous tissue will be retained. The mixture of tallow and water, together with a small proportion of the tissue, is led into a second drum similar to the last-described one; but with holes of about 0.03 inch in size, and after filtering the mass through these perforations the water is separated from the tallow by decantation, and the tallow is then treated in a water bath. The nitrogenous tissue retained in the drums, after being allowed to drain, are pressed into cakes and dried.

The advantages of the above-described process are, first, the complete extraction of the tallow effected at a temperature of about 130° Fahrenheit in the presence of water, with or without admixture of chloride of sodium, carbonate of potash, or pepsine. This extraction is obtained in a minimum duration of time, which should not exceed five minutes, owing to the intimate mixture rapidly produced in the churning apparatus. Second, the complete extraction of the tissues without loss of nitrogenous matter, and the use thereof either for food or the manufacture of manure.

We are aware that it is not new to insert fats into a perforated revolving drum in which are loose blocks, and to subject it to the action of water while the said drum is rotated. This method differs from ours in several important respects.

We claim as new—

The herein-described process for extracting tallow and fats, which consists in first cutting the said tallow or fat fine and shredding it, then subjecting it to a pugging process without water and under the influence of heat to about 68° to 86° Fahrenheit, then subjecting the pugged mass to a churning operation while mixed with water and steam at a temperature of about 136° Fahrenheit, and then subjecting it to a final churning and straining operation, substantially as described, whereby the mixture of water and fat is separated from the nitrogenous substances, substantially as herein described.

In witness whereof we have hereunto signed our names in the presence of two subscribing witnesses.

HENRI LISSAGARAY.
HIPPOLYTE LEPLAY.

Witnesses:
CHARLES HAUVEL,
AMAND RITTER.